United States Patent [19]

Sahawneh

[11] Patent Number: 4,936,013

[45] Date of Patent: Jun. 26, 1990

[54] MECHANICAL HEAT EXCHANGER PUNCH TOOL AND METHOD

[75] Inventor: Maeen N. Sahawneh, Mobile, Ala.

[73] Assignee: Chevron Research Company, San Francisco, Calif.

[21] Appl. No.: 361,080

[22] Filed: Jun. 5, 1989

[51] Int. Cl.[5] ........................ B23P 21/06; B23P 15/36

[52] U.S. Cl. ........................ 29/890.031; 29/402.08; 30/92

[58] Field of Search .................... 30/92, 92.5, 103–108; 29/157.3 C, 157.4, 402.08, 426.4; 165/76; 138/89

[56] References Cited

U.S. PATENT DOCUMENTS

| | | | |
|---|---|---|---|
| 3,898,896 | 8/1975 | Suhay | 81/72 |
| 4,165,784 | 8/1979 | Gardner | 166/55.3 |
| 4,455,746 | 6/1984 | Idzik et al. | 30/106 |
| 4,466,185 | 8/1984 | Montiero | 30/103 |
| 4,646,816 | 3/1987 | Rothstein | 29/157.4 X |
| 4,730,392 | 3/1988 | Allen | 30/106 |

FOREIGN PATENT DOCUMENTS

| | | |
|---|---|---|
| DE2948049 | 9/1981 | Fed. Rep. of Germany . |
| 2416760 | 10/1979 | France . |

*Primary Examiner*—Douglas D. Watts
*Attorney, Agent, or Firm*—Edward J. Keeling; Robert D. Touslee

[57] ABSTRACT

A punch tool is disclosed for creating an aperture in the wall of a heat exchanger tube. The punch tool comprises a cylindrical stem and bit means which is inserted into the tube from the tube sheet. The stem is retracted while the bit is forced upright by a rigid rod and punctures the tube.

5 Claims, 1 Drawing Sheet

MECHANICAL HEAT EXCHANGER PUNCH TOOL AND METHOD

FIELD OF THE INVENTION

This device relates to tools employed for puncturing an aperture in a tube. More specifically, the tool is used to puncture heat exchanger tubes, allowing evacuation of fluids prior to plugging the tube ends.

BACKGROUND OF THE INVENTION

Repairs to a heat exchanger tube often require the plugging of the tube ends when part of the tube becomes corroded or begins to leak. However, before a tube end can be plugged, it is necessary to puncture or sever the body of the tube to evacuate liquid which may be present and create a venting means within the tube. If this is not done, there may be a subsequent pressure buildup in side the plugged tubes when the heat exchanger is returned to service and eventually the plug may blow out, or the tube rupture.

Due to the nature of many types of heat exchangers, access to the tubes is usually restricted; consequently, they must be cut from the inside. Prior to development of the present device, a common procedure for severing tubes to be plugged employed a mechanical fly cutter. One such device is described in U.S. Pat. No. 4,455,746. Such a tool consists of a specially designed pair of cutting bits enclosed within a cutter body. For normal cutting operations the tool is inserted into the tube to be severed, the cutter bits are extended from within the tool by a retractable mandrel, and then the cutter bits are spun in a circular fashion by an air motor. When the bits are fully extended, the tube will normally be completely severed. Afterward, the mandrel is retracted causing the bits to retract within the cutter body thereby allowing removal of the tool.

There are several disadvantages to such a cutting procedure. Using the mechanical fly cutter is a slow and somewhat involved procedure requiring an external driving means such as an air motor and an associated air compressor. Additionally, once the tube has been severed, it is then free to vibrate and possibly to damage surrounding tubes when the heat exchanger is returned to service. The damaged tubes may then require repair as well. Another disadvantage of the cutter device is that metal shavings from the cut tube and dirt may enter the inside of the cutter body where the bits extend, causing the bits to lock in the extended position. When this occurs, it is often difficult or impossible to remove the cutter assembly without damaging or breaking the bits; and thereby necessitating their replacement. Other tools are also known for puncturing tubes to be plugged, but they are often disadvantageous for use in some applications, particularly tubes of small diameter. One such device, described in U.S. Pat. No. 4,730,392, assigned to the assignee of the present application operates on a hydraulic principle. It has been found the hydraulic device may not be well suited to some heat exchangers, particularly ones having smaller tube diameters.

The present invention operates on a mechanical principle and has few moving parts. Thus, the device is quite simple to operate and relatively inexpensive to fabricate.

SUMMARY OF THE INVENTION

The present invention relates to a mechanical punch tool for puncturing heat exchanger tubes. The tool is inserted into the tube beyond the tube sheet, and mechanical force is applied. This urges a hardened tool bit to puncture the tube wall outwardly from the inside of the tube, while not damaging surrounding tubes. The tube maintains structural integrity by remaining attached to the tube sheet and even though later plugged off, the tube is not free to vibrate or damage surrounding tubes when the heat exchanger is returned to service. The tool is then removed, and the ends of the tube are plugged in the normal manner. The tool comprises a cylindrical stem having a first end with a recessed cavity formed in the first end of the cylindrical stem and a radial surface in the cavity, with a bit radially mated within the recessed cavity and being able to swivel to an upright position substantially perpendicular to the stem from an inclined position. The bit has a cutting print and a swivel end and is pivotally connected to the cylindrical stem in the recessed cavity. A rod backer having a bore through which the stem may slide is positioned at the end opposite the stem and having the recessed cavity. In one embodiment, a solid rod is rigidly positioned between the rod backer and the bit such that the rod is held in place against, but not necessarily connected to, the rod backer at one end and contacts, or nearly contacts, the bit near the tip when the bit is in the inclined position. When the stem has been inserted into a tube to be punched, a mechanical force is applied so that the stem is forced to move in the direction of the non-recessed end of the stem. Due to the movement of the stem relative to the rod backer, the bit is urged into an upright position substantially perpendicular to the stem and in the process punctures the tube from the inside tube wall. In one embodiment, a stem nut having threads therein is threadably mated to the stem at the end not having the recessed cavity and when in its initial position is flush on one face to the rod backer. When the stem nut is rotated by conventional means such as a wrench around the stem, the stem, through the threads is urged to move in the direction of the threaded end.

The punch tool is superior in operation to the alternative methods of evacuating a tube prior to plugging off the tube due to its simple and safe mechanical design, minimal number of moving parts, and reliability. Because it is less costly than alternative designs and devices, a user may have this tool in several diameters available to service, for about the same cost as a single tool of prior designs.

DETAILED DESCRIPTION OF THE INVENTION

Figure 1:
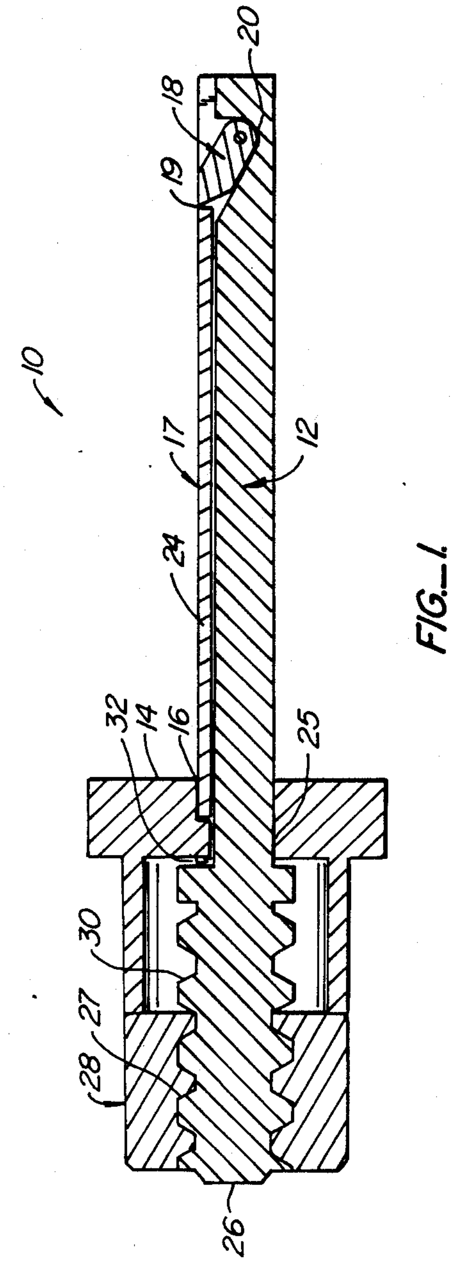
FIG. 1 is a side view of the tool in the insertion position with the bit inclined.

As best shown in FIG. 1, the mechanical tube cutter of the present invention comprises a stem assembly 10 and a rod backer 14. The stem assembly 10 includes a generally cylindrical stem 12 having at one end a recessed cavity 20. Within the recessed cavity there is located a hardened bit 18 which has a cutter point 19 and which is machined to mate radially with the surface of the recessed cavity 20. As shown in FIG. 1, the recessed cavity 20 is machined such that when the tool is in the insertion position, the bit is inclined.

The rod backer 14 has a stem access bore 25 through which the stem 12 passes. Between the rod backer 14 and bit 18, a rigid rod 24 is placed parallel to the stem and held in place at one end against the rod backer. The other end of the rigid rod extends along the stem to a point of contact with the cutter point 19. In this example, when the tool is in the insertion position, the bit is inclined so that the bit tip 19 does not extend beyond the plane formed by the outer side 17 of the rod. In this manner, the stem 10 may be inserted into the tube without contacting the bit tip 19 with the tube wall.

On the rod backer side opposite the rod is located means for forcing sliding movement of the stem, through the rod backer bore, relative to the rod backer. In a preferred embodiment, the forcing means comprises a stem nut 28 having inner threads 27 which mate to threads 30 on the stem 12. When the tool is in the insertion position, the threaded portion of the stem contacts the rod backer at a thread stop 32 and does not allow the stem to move further in the direction of the bit end relative to the rod backer. During rotation, the stem nut 28 remains in flush contact with the rod backer 14.

Figure 2:
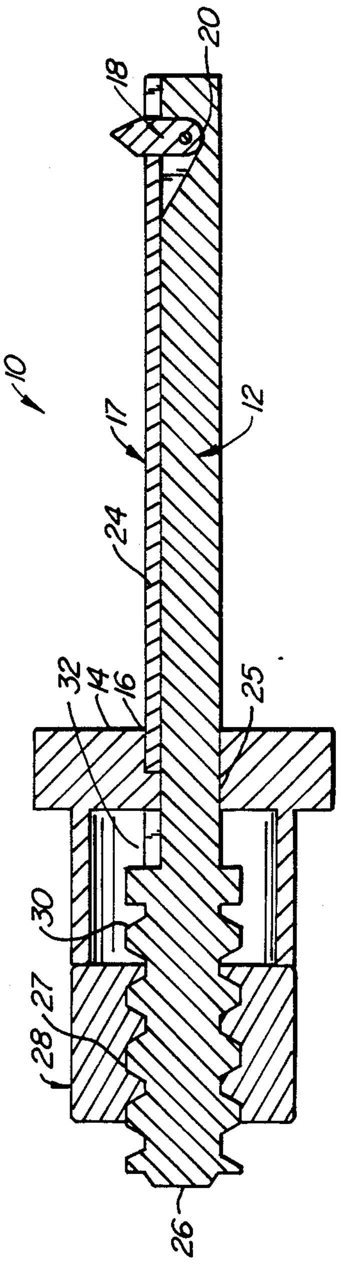
FIG. 2 is a side view of the tool in the puncture position with the bit uprighted.

In operation, the bit end of the stem assembly 10 is inserted into the tube of the heat exchanger to be punctured, rotating as necessary until the bit is positioned aside the point of the tube wall to be punctured. A force is applied in the preferred embodiment by rotating the stem nut 28 about the stem 12, thereby moving the stem along the stem access bore 25 in the direction of the threaded stem end. The stem 12 thus slidably moves through the bore of the rod backer 14. When the stem 12 is moved relative to the rod backer 14 in the direction of the stem nut end, the rigid rod 24 urges the bit from the inclined position shown in FIG. 1, to a fully extended position shown in FIG. 2. Extension of the bit 18 beyond the plane formed by the outer surface 17 of the rod 24 forces the bit through the tube forming an aperture in the tube. Fluid which may be present inside the tube may now be evacuated through the aperture. In removal of the tool, the above described process is in essence reversed. The stem nut is rotated, in the preferred embodiment, until the thread stop 32 contacts the rod backer 14. Movement of the stem in the direction of the bit end relative to the rod backer allows the bit to move from the uprighted position of FIG. 2 to the inclined position of FIG. 1, allowing the tool to be removed. With fluid drained and a permanent aperture remaining in the tube wall, the tube may be plugged off at the tube sheet by conventional means without danger of boiling liquids or expanding vapors rupturing the plugged tube when the exchanger is returned to service Although a preferred embodiment of the present invention has been illustrated and described, other changes will occur to those skilled in the art. It is, therefore, intended that the scope of the present invention is to be limited only by the scope of the appended claims.

What is claimed is:

1. A tube punch comprising:
rod backer means having a circular bore
a cylindrical stem having a first and second end movably positioned in said circular bore, a recessed cavity with a radial surface formed adjacent the first end of said cylindrical stem
bit means having a cutting point and a swivel end pivotably connected to he cylindrical stem in the recessed cavity thereof and having a recessed position and an upright position
and rod means unconnected to said rod backer for forcing said bit from said recessed position to said upright position stem access.

2. The tube punch of claim 1, further comprising:
a stem nut threadably mating to the second end of the cylindrical stem.

3. A tube punch comprising:
a cylindrical stem having a first and second end, the first end having a recessed cavity with a radial surface; bit means having a cutting point and a swivel end, the swivel and radially mated with the stem in the recessed cavity;
rod backer means having a circular bore where the stem is slidably located;
means for forcing the stem to move along the stem access through the rod backer in a direction of the second stem end;
means for urging the bit upright into a position substantially perpendicular to the length of the stem when the stem is forced in the direction of the second stem and relative to the rod backer means.

4. A method for evacuating fluid from a tube in a heat exchanger, without severing the tube, prior to plugging the tube at the tube sheet, comprising the steps of:
(a) inserting a tool punch having a stem with a bit into the tube at the tube sheet;
(b) forcing the stem to move in a direction away from the tube sheet;
(c) puncturing without severing the tube with a bit as the bit is uprighted to a position substantially perpendicular to the stem as a result of the forcing step;
(d) plugging off the tube at the tube sheet.

5. The method of claim 4 wherein the forcing step includes the steps of:
turning a stem nut about a threaded portion of the stem when a face of the stem nut is positioned flush against the rod backer.

* * * * *